United States Patent
Berroth et al.

(10) Patent No.: US 11,125,250 B2
(45) Date of Patent: *Sep. 21, 2021

(54) FAN DEVICE AND USE OF SUCH A FAN DEVICE

(71) Applicant: EBM-Papst St. Georgen GmbH & Co. KG, St. Georgen (DE)

(72) Inventors: Hansjoerg Berroth, VS-Obereschach (DE); Hans-Peter Krack, Schonach (DE); Bernd Maier, Triberg (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 272 days.

This patent is subject to a terminal disclaimer.

(21) Appl. No.: 15/026,645

(22) PCT Filed: Aug. 12, 2014

(86) PCT No.: PCT/EP2014/067253
§ 371 (c)(1),
(2) Date: Apr. 1, 2016

(87) PCT Pub. No.: WO2015/049075
PCT Pub. Date: Apr. 9, 2015

(65) Prior Publication Data
US 2016/0245306 A1   Aug. 25, 2016

(30) Foreign Application Priority Data
Oct. 1, 2013   (DE) .................. 10 2013 110 870

(51) Int. Cl.
*F04D 29/58*   (2006.01)
*F04D 29/52*   (2006.01)
(Continued)

(52) U.S. Cl.
CPC ....... *F04D 29/5813* (2013.01); *F04D 19/002* (2013.01); *F04D 19/007* (2013.01);
(Continued)

(58) Field of Classification Search
None
See application file for complete search history.

(56) References Cited

U.S. PATENT DOCUMENTS 4,164,690 A * 8/1979 Muller ................ F04D 25/0653
310/63
6,244,818 B1 * 6/2001 Chang .................... F01D 25/24
415/193

(Continued)

FOREIGN PATENT DOCUMENTS

CN       101175922 A    5/2008
DE       2 165 419      7/1973
(Continued)

OTHER PUBLICATIONS

Chinese office action for Application No. 2014800545463 dated Mar. 28, 2017.
(Continued)

*Primary Examiner* — Peter J Bertheaud
*Assistant Examiner* — Geoffrey S Lee
(74) *Attorney, Agent, or Firm* — Bachman & Lapointe, PC; George Coury

(57) ABSTRACT

A fan device including an electric motor assembly (24, 26) designed to drive at least one blade wheel (34, 36) in a flow channel (18) provided axial to the blade wheel, an electronic assembly (38, 40), which forms commutator and/or ballast electronics for the electric motor assembly, is arranged in series with the electric motor assembly, and is produced on a circuit carrier, and a carrier unit (14) formed axially on or in the flow channel for retaining the electric motor assembly, (Continued)

wherein the carrier unit, which forms an inner circumference of the flow channel at least in sections, is made from a thermally conductive material, wherein the carrier unit has, on an outer segment (16) radially opposite to the flow channel, a mounting and cooling surface for interacting with the circuit carrier and/or power electronics components provided thereon in a heat-dissipating manner.

20 Claims, 3 Drawing Sheets

(51) Int. Cl.
  *F04D 25/06* (2006.01)
  *H02K 11/33* (2016.01)
  *F04D 29/32* (2006.01)
  *H02K 9/06* (2006.01)
  *F04D 19/00* (2006.01)

(52) U.S. Cl.
  CPC ....... *F04D 25/068* (2013.01); *F04D 25/0693* (2013.01); *F04D 29/325* (2013.01); *F04D 29/522* (2013.01); *H02K 9/06* (2013.01); *H02K 11/33* (2016.01)

(56) References Cited

U.S. PATENT DOCUMENTS

| | | | | |
|---|---|---|---|---|
| 6,592,400 B2* | 7/2003 | Shy | ............... | H05K 7/20172 439/527 |
| 6,612,817 B2 | 9/2003 | Lin et al. | | |
| 6,924,979 B2* | 8/2005 | Clements | ............ | H05K 7/20172 310/68 R |
| 7,014,420 B2* | 3/2006 | Chang | ................... | F04D 29/542 415/121.2 |
| 7,218,515 B2 | 5/2007 | Vinson et al. | | |
| 7,275,911 B2* | 10/2007 | Lee | ..................... | F04D 25/0613 415/211.2 |
| 7,626,295 B2* | 12/2009 | Yamaguchi | ........... | F04D 29/281 310/156.32 |
| 7,824,154 B2* | 11/2010 | Yabuuchi | ............. | F04D 25/0613 415/211.2 |
| 8,087,886 B2* | 1/2012 | Lin | ........................ | F04D 17/025 415/214.1 |
| 8,113,774 B2 | 2/2012 | Yang et al. | | |
| 2002/0015648 A1* | 2/2002 | Kosugi | ................. | F04D 25/166 417/423.14 |
| 2006/0262499 A1* | 11/2006 | Vinson | .................... | F04D 27/00 361/679.48 |
| 2007/0104593 A1* | 5/2007 | Yamaguchi | ........... | F04D 29/281 417/354 |
| 2008/0124234 A1* | 5/2008 | Echazarreta | .......... | F04D 29/541 417/423.14 |
| 2008/0279694 A1* | 11/2008 | Chou | .................... | F04D 19/007 416/244 R |
| 2010/0119385 A1* | 5/2010 | Hanaoka | ............... | F04D 19/007 417/244 |
| 2012/0163973 A1* | 6/2012 | Yu | ........................ | F04D 25/0633 415/227 |
| 2013/0149122 A1* | 6/2013 | Yeh | ..................... | F04D 25/0613 415/183 |
| 2014/0111040 A1* | 4/2014 | Badafem | ................. | H02K 5/148 310/51 |

FOREIGN PATENT DOCUMENTS

| | | |
|---|---|---|
| DE | 102 31 986 | 2/2003 |
| DE | 102 04 830 | 6/2003 |
| DE | 20 2007 010 761 | 1/2008 |

OTHER PUBLICATIONS

German Office action for Patent Application No. 10 2013 110 870.9 dated May 20, 2014.

International Patent Application No. PCT/EP2014/067253 search report dated Jan. 16, 2015.

* cited by examiner

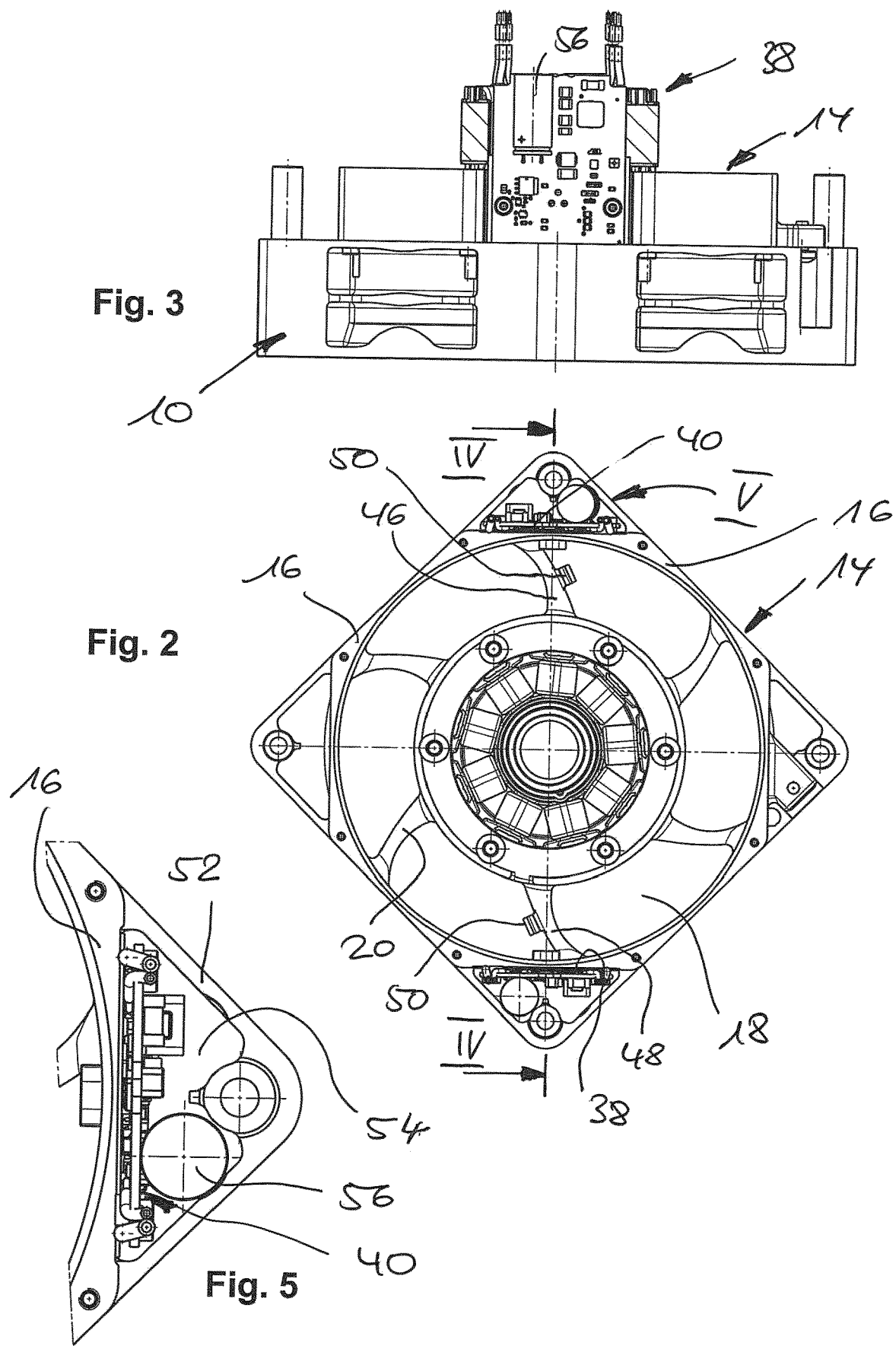

FAN DEVICE AND USE OF SUCH A FAN DEVICE

BACKGROUND OF THE INVENTION

The present invention relates to a fan device. Furthermore, the present invention relates to the use of such a fan device in a power electronics context, for example in the area of telecommunications, data-server and transmission technology, with high power requirements on the fan performance of such a fan device.

Generic fan devices are generally known from the prior art; an electric motor assembly (as a single fan motor with a driven blade wheel, more often as an assembly comprising two or more electric motors with respectively assigned blade wheels) is typically retained on a carrier unit in a flow channel; a housing or frame structure then axially surrounds (i.e. along the rotational axis of the ventilation motor(s)) the carrier unit and thus creates a modular fan, which can be used suitably in (typically predetermined) ventilation cross-sections.

Such fan devices presumed to be generally known and forming a generic class are particularly frequently found in connection with so-called high-performance systems, i.e. ventilation requirements which call for high-power fans. It is not unusual for such fan modules, with cross-sectional diameters of the flow channel (corresponding in this regard to edge lengths of associated square fan housings) typically between 9 and 15 cm, to give rise to electrical power consumptions of 200 W and over, wherein both co-rotating and contra-rotating rotation principles of the blade wheels are implemented by means of a plurality of electric motors in the embodiment of the electric motor assembly.

Such levels of electrical power, often combined with limiting spatial requirements on installation dimensions (and therefore on a maximum diameter of a flow channel to be created, as well as a maximum axial extension dimension of a device), require optimisation measures both in the flow-related regard, as well as with regard to power electronics typically assigned to each individual ventilation motor. For the best possible fluid (air) throughput, the effective flow cross-section in the flow channel should as far as possible be unhindered by struts, supports, other obstructions or such-like, wherein the centrally arranged electric motor assembly should likewise occupy a minimised cross-sectional area. At the same time, the power semiconductors typically used in the described electrical power range for control and commutation give rise to considerable heat generation at or on an associated circuit carrier, once again with the optimisation problem that a larger circuit carrier more favourable from the thermal standpoint has an adverse effect on effective flow cross-sections in the flow channel, whilst compact embodiments of such circuit carriers limit the achievable electrical power on account of the maximum temperatures that can be reached. An aggravating factor is that circuit carriers presumed to be known from the prior art, provided axially adjacent to an associated fan motor and retained on the carrier unit, are not only ventilated poorly by the flow medium in the flow channel on account of this arrangement (for example, due to low circumferential air speeds), but also occupy axial installation space, which in conjunction with a reliable axial extension also limits the possible overall length of active components. In the present context of high-power fan devices, this aspect is in turn not uncritical, since correspondingly high-power ballast electronics requires, apart from adequate cooling, also electronic components with high axial installation space requirements, for example electrolytic capacitors with capacitances up into the mF range.

Finding a solution to the fan power with identical mechanical dimensions by using permanent magnets generated by means of so-called rare earth magnetic materials can be regarded as a potentially obvious optimisation approach from the prior art; such materials enable increased magnetic field strengths and potentially reduced volumes of active components, but lead to markedly increasing material and production costs, so that alternatives are desirable precisely from the standpoint of cost-effective large-series or mass production of fan devices of the generic type.

A carrier unit of the generic type inside a fan frame is known from DE 102 04 830 B4, wherein the carrier unit is designed in a heat-dissipating manner, in such a way that heat arising or absorbed especially in the hub region (i.e. in the centre of the flow channel) is dissipating to a lateral edge region via struts which cross the cross-section of the flow channel. Whilst such technology appears in principle to be suitable also for dissipating heat from power electronics circuit carriers in the hub region, there is also the problem that corresponding struts or fins are constituted as good heat conductors in terms of material, and also possess heat conducting cross-sections as large as possible for the purpose of the most effective possible heat dissipation. However, this in turn has an adverse effect on the effective flow space in the flow channel, so that such a solution variant for heat dissipation from the hub region of a generic fan device also has to be regarded as unfavourable and in need of improvement.

SUMMARY OF THE INVENTION

The problem of the present invention, therefore, is to optimise a fan device both with regard its flow-related fan properties, as well as its electrical power consumption and power output properties.

In particular, this requires the creation of conditions such that increased electrical power can be accommodated securely against malfunction by improved cooling of commutator or ballast electronics arranged in series with the electric motor assembly, and at the same time that the fan device achieves minimum dimensions, both with regard to a maximum achievable diameter of the flow channel (in this regard corresponding to a cross-sectional area of the air passage) and also a minimised axial extension of the device.

The problem is solved by the fan device with the features disclosed herein; advantageous developments of the invention are also described. Independent protection within the scope of the invention is also claimed for a use of such a fan device according to the invention, which is provided in particular for the ventilation of control cabinets, system cabinets or system rooms of power or high-frequency transmission electronics and has proved particularly favourable precisely for such high-performance power requirements.

In an advantageous manner according to the invention and in a departure away from the principle presumed to be known, that of providing the circuit carrier for the commutator and ballast electronics of a given fan motor adjacent to the latter on the hub side, such a circuit carrier is displaced in cross-section into the outer region of the flow channel within the scope of the invention, wherein, in a structurally particularly elegant and efficient manner, the carrier unit according to the invention on the one hand retains a respective fan motor (the electric motor assembly) together with a blade wheel in a hub-like manner in the axial centre of the flow channel, at the same time limits the flow channel at the casing side by means of a preferably annular wall segment and, with this casing segment, on the outside, offers an effective mounting and cooling surface for the circuit carrier, so that this assembly heated when under electrical load can be efficiently cooled in cooperation with the carrier unit. In a manner that is favourable in terms of the flow, this takes place on the casing side of the carrier unit, i.e. outside the flow channel and therefore without adversely affecting the flow behaviour. At the same time, an effective temperature reduction on the circuit carrier takes place both due to the large-area embodiment of the carrier unit on the outer segment, and also due to the internal cooling associated with the fluid flow, so that, in direct contrast with the above-described technique of heat dissipation from the hub region, a markedly improved heat dissipation enables correspondingly optimised electrical powers. Within the scope of the invention, a suitable electrical insulation is implied in the heat-dissipating interaction between the circuit carrier and the associated outer segment of the carrier unit, in order that the carrier unit (typically produced from a metal material) does not short-circuit the power electronics on the circuit carrier. Within the scope of the advantageous embodiments of the invention, such an effect can be achieved for example by heat-conducting (e.g. ceramic) insulating films of an otherwise known type, which are introduced between the circuit carrier and the cooling surface of the carrier unit.

According to a development, it is preferable, within the scope of the invention, for the (metallic) carrier unit to be produced by a casting or extrusion process (supplemented or replaced by a machining production process), wherein a one-piece embodiment of this carrier unit between a central hub section, the outer or casing segment and struts lying in between can also preferably be optimised in terms of flow, for example by arches, rounded portions or suchlike formations of the strut cross-section or surface, constituted corresponding to a given flow course in the flow channel. Use can also be made of other materials for producing the carrier unit, for example ceramics, wherein favourable heat dissipation properties are required in the region of the outer segment as a cooling surface according to the invention, but not for example in the connection (struts) between the hub section and the outer or casing region of the carrier unit. On the contrary, apart from an optimisation of a given flow cross-section by struts, a limitation of the number of struts can also take place here, wherein, for aerodynamic reasons, not more than four to eight struts have proved to be favourable in the practical implementation of the invention.

The present invention accepts the apparent drawback that, as a result of the displacement of the power electronics components with the associated circuit carrier to the cross-sectional edge of the fan device outside the flow channel, an electrical circuit arrangement (with required line cross-sections) is required between the circuit carrier and the associated (hub-side) fan motor. However, this is solved in a particularly elegant manner in terms of design and as an advantageous development by the fact that the struts of the carrier unit can be used for the line routing of such electrical supply lines, for example by means of terminals or such routing elements, which lead supply cables from the cooled circuit carrier, held at the edge, to the central fan motor (wherein the carrier unit in the casing region also preferably comprises a suitable opening or bore, electrically insulated against current-carrying parts, for the lead-through of these lines and thus complies with air-gap and creepage-distance stipulations required by the standards).

In an advantageous development of the invention, the inventive mounting and cooling surface on the outer segment of the carrier unit is constituted by a suitable flat portion, preferably, in cross-section, a polygonal (e.g. octagonal) outer contour of the carrier unit (wherein the inner contour for the flow channel is then typically constituted hollow-cylindrical or annular). Not only does such an angular outer contour enable a compact and easily mountable outer shape, but also such an assembly can be particularly easily integrated into the frame or housing structure as a further development according to the invention, said frame or housing structure, in combination with the (metallic) carrier unit, permitting the fan device to emerge in a compact manner as a carrier or housing module. Specifically, provision is advantageously made according to a development such that such a frame or housing unit suitably accommodates the carrier unit, for example integrates the latter axially on one side or on both sides. Within the scope of the present invention, such a frame or housing unit can be produced particularly easily from a plastic material. Not only is this favourable in terms of production and suitable for mass production, but also the previously discussed heat-dissipation and cooling properties of the carrier unit enable the advantageous property of the invention, that it is not the entire housing that has to be produced from a (heat-dissipating) metal material or suchlike. Such shell-shaped housing elements then form the outer contour of the fan device, wherein a square outer contour is often specified and implemented, and wherein such a square cross-sectional contour has, in an optimally compact manner, edge lengths which correspond to the diameter of the flow channel (in addition to wall thicknesses of the carrier unit or a housing shell).

If such a frame or housing embodiment is then brought together with the inventively flattened outer contour of the carrier unit, an internal space for accommodating the circuit carrier in corner regions advantageously arises according to the invention, said internal space being bordered inwardly by the casing or outer segment of the carrier unit, and outwardly as well as axially by a wall or corner-wall section of a housing shell; the invention thus advantageously makes it possible to use installation space, which remains unused in respective corners of the housing for a preferably hollow-cylindrical structure of the flow channel, to be used effectively for accommodating and cooling the circuit carrier(s).

This inventive idea undergoes a further improvement within the scope of preferred embodiments of the invention by the fact that such an internal space is additionally ventilated—brought about by suitably dimensioned perforations in preferably end wall regions of the frame or housing unit; as a result of such perforations as a further development (corresponding to the selected opening cross-section), not only does additional air for the heat exchange pass into the accommodation for a respective circuit carrier, but also the arrangement of these perforations can be configured in such a way that an auxiliary air connection (limited in cross-section according to the opening widths) arises between the inlet and outlet of the fan device, said auxiliary air connection effectively contributing to the cooling of the circuit carrier (already cooled of course by the thermal connection with the carrier unit) and thus additionally improving the electrical power properties (even though the actual ventilation efficiency is slightly reduced by the auxiliary air connection).

Whilst the present invention can in principle also be implemented by means of a single rotor motor (wherein the electric motor assembly according to the invention then comprises a single fan motor with an associated blade wheel), the present invention proves to be particularly efficient if a pair of fan motors, also preferably each constituted as external rotors with brushless commutation, are held axially with respect to one another at the hub side by the carrier unit and assigned fan wheels are then driven unidirectionally or counter-directionally according to a given fan principle. Associated control and power electronics sit on assigned circuit carriers corresponding to a given number of fan motors, wherein it is advantageous from the thermal standpoint then to provide this plurality of circuit carriers suitably distributed around the periphery of the carrier unit, for example in the case of a pair of circuit carriers (corresponding to a pair of fan motors) to provide the latter lying opposite one another, also preferably in chambers formed in respective internal spaces, i.e. between the carrier unit and an external housing shell. It also emerges from the basic idea of the invention that the invention is also not limited to two motors, but on the contrary a plurality of units required according to the given fan principle and ventilation purpose can be provided and assembled in the inventive manner, wherein the present invention is not limited to the fact that the circuit carrier according to the invention (or the power electronics provided thereon with the respective components) is provided only on a single carrier unit, e.g. its printed circuit board. On the contrary, the invention also makes provision in a variation such that the commutator or ballast electronics provided for a single motor (or for a plurality of motors) can be distributed on a plurality of circuit carriers, which can then in turn be disposed suitably along the outer periphery of the carrier unit and be fastened in a suitably heat-dissipating manner.

As a result, the present invention achieves, in a particularly elegant manner, the specified aim of optimising known design and structural concepts of fan devices with respect to their axial (and radial) compactness, thereby creating the possibility of increased electrical power by markedly improved cooling and nonetheless of creating an assembly which can be produced cost-effectively, requires low component costs and is straightforward in terms of assembly. Correspondingly, it is within the scope of the present invention to develop fan devices of the type according to the invention which provide fan motors in an inventively axial manner, to which no electronic assembly, in particular no axial printed circuit board, is assigned axially, but on the contrary this/these printed circuit board(s) is/are provided solely in the inventive manner at the radial edge and outside the flow channel in a heat-dissipating manner. It is likewise within the scope of the present invention to create the fan motors of the electric motor assembly without the use of costly rare earth permanent magnets, so that the present invention brings significant advantages especially from the standpoint of mass production and efficiency.

Whilst it is particularly preferred within the scope of the invention to use the invention in the described high-performance application areas, i.e. in particular in connection with the ventilation or cooling of the surroundings of power, transmission and high-frequency electronics, the present invention and its use are nonetheless not limited to such an area of application. On the contrary, the present invention is suitable for any area of application in which compact structural dimensions with favourable flow properties and optimised heat dissipation of motor power electronics need to be combined.

BRIEF DESCRIPTION OF THE DRAWINGS

Further advantages, features and details of the invention emerge from the following description of preferred examples of embodiment and with the aid of the drawings; in the figures:

FIG. 2 shows a front view (end view) of the example of embodiment of FIG. 1;

FIG. 3 shows a side view of the fan device according to FIG. 1 in the partially assembled state (with only one housing shell);

FIG. 5 shows a detailed view of a corner section (internal space) marked by V in the representation of FIG. 2.

DETAILED DESCRIPTION

Figure 1:
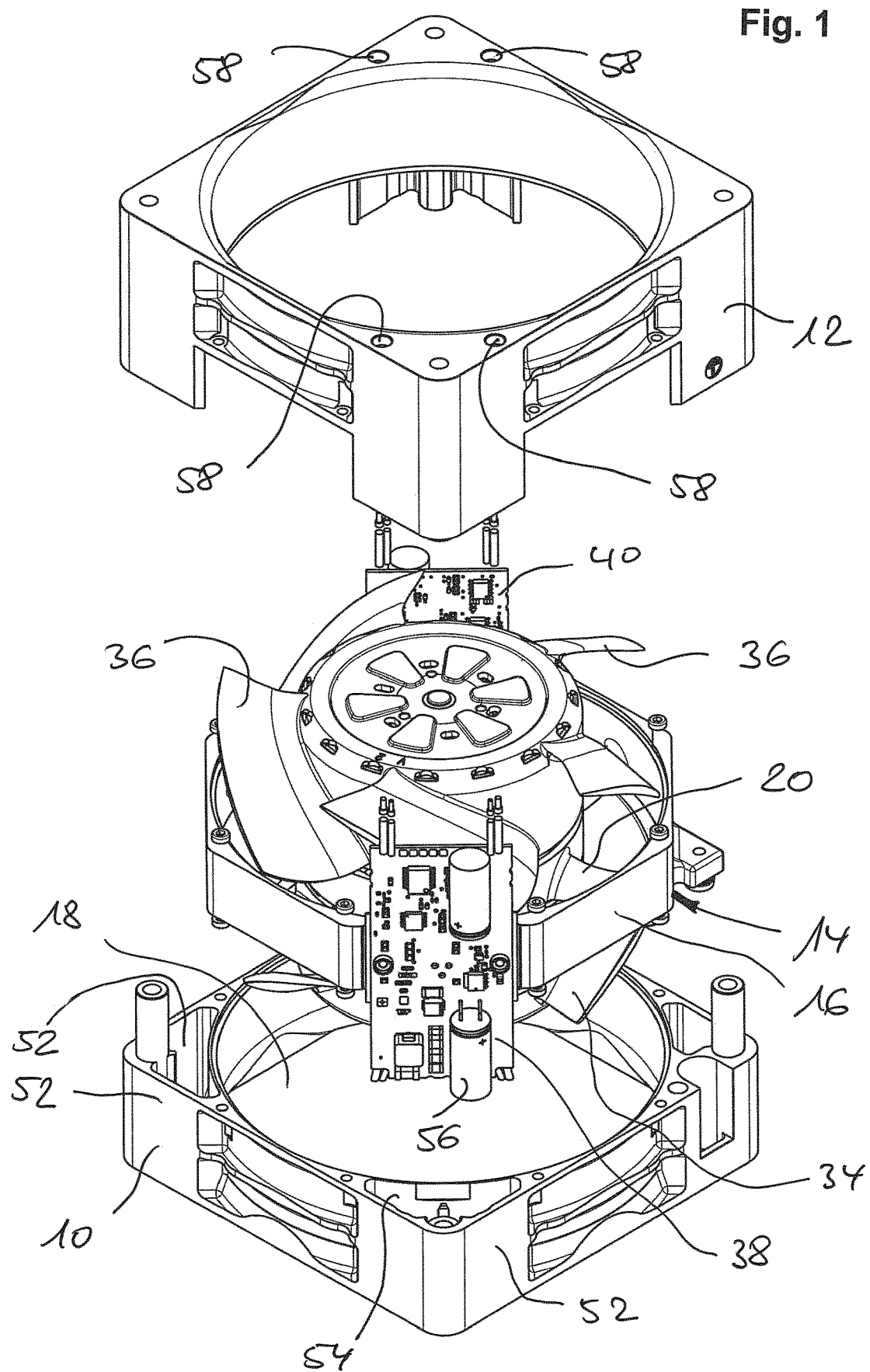
FIG. 1 shows a perspective representation of a fan device of a first embodiment of the present invention in an exploded representation.

The modular fan device preferably produces an electrical power consumption above 300 W, also preferably above 500 W. The example of embodiment of the fan device of the present invention represented in FIGS. 1 to 5 produces, with a flow channel diameter of 12 cm and the shown contra-rotating fan motor pair together with blade wheels with a power consumption between 500 W and 600 W, an air throughput of 780 m3/h free-blowing and a working range around 579 m3/h/1600 Pa and is thus provided in particular for the ventilation of systems of high-frequency transmission electronics and of high-power servers or high-power computer systems, in combination with further modules of the type shown in the figures. The structure represented here is particularly well suited for use in applications with a high packing and/or power density and resultant high aerodynamic system impedance.

Specifically, a carrier unit 14 produced in one piece from cast aluminium is held between a lower housing shell 10 (perspective view of FIG. 1) and an upper housing shell 12, both produced as plastic injection moulded parts, which carrier unit, see plan view of FIG. 2, constitutes an outer casing 16 with an octagonal peripheral contour, whilst a hollow-cylindrical flow space 18 is bounded in the internal region of the outer casing. Casing or outer segment 16 is connected, by means of six strut sections 20 formed in one piece, to a central hub section 22, at which fan motors 24 and 26 are held (as shown diagrammatically for example in the longitudinal cross-sectional view of FIG. 4). The cross-sectional view of FIG. 4 also illustrates that the mechanical connection to fan motor pair 24, 26 is also created by a sleeve 32 engaging in bores of flange ring 22 and extending axially (for example along dot-dash line 30 in FIG. 4). Blade wheels (34 and 36, FIG. 1) are assigned in an otherwise known manner to motors 24, 26 constituted as external rotors, there being no need to deal in further detail with their structural embodiment, bearing or blade dimensioning.

An associated pair of power electronics assemblies 38 and 40 installed on printed circuit boards as circuit carriers is assigned to the pair of fan motors 24 and 26 respectively. As can be seen from the views in the figures, these circuit carriers constituted rectangular comprise in an otherwise known manner the commutator and ballast electronics for a given one of the assigned fan motors, i.e. in the form of the functionalities (otherwise known and not represented in detail) of the driver output stage, the current or power limitation, the voltage supply and the intermediate circuit (together with EMC components) as well as the motor management and rotor position detection.

As the figures show, these printed circuit boards 38 and 40 are in heat-conducting contact (although insulated by a thin heat-conducting and ceramic intermediate layer) with a casing-side/outer flat segment of carrier segment 16; FIG. 1 shows in the exploded view how a printed circuit board adapted in width to a corresponding flat side of carrier unit 14 engages in a heat-conducting manner on the metal element, with the effect that heat dissipation can be generated efficiently and over a large area.

Figure 4:
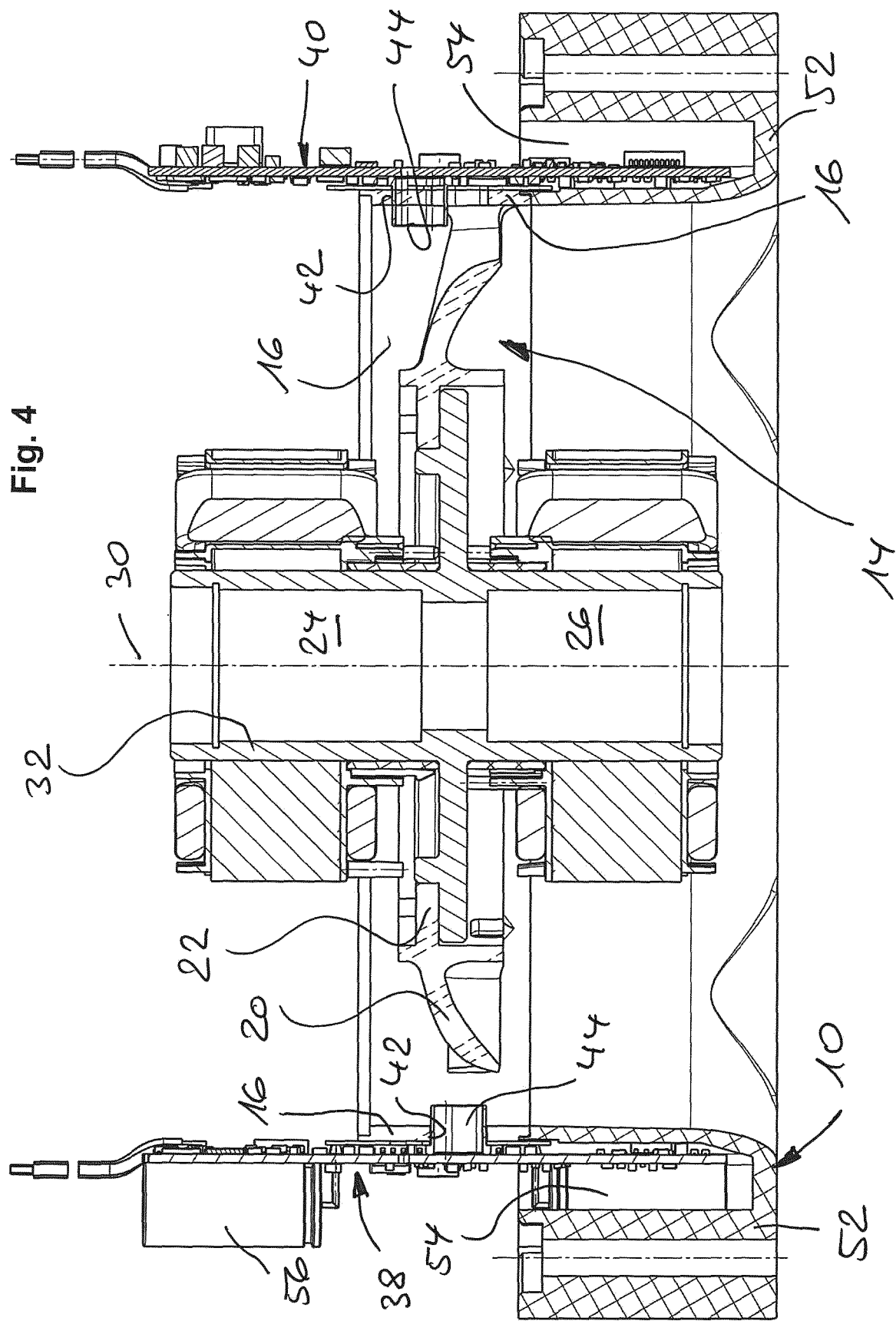
FIG. 4 shows a cross-sectional view along intersecting line IV-IV in FIG. 2

FIG. 4 illustrates further details of this arrangement in the outer casing region of carrier unit 14. By means of an insulating sleeve 44 suitably guided in a bore 42 of casing region 16 into the flow internal space and insulated cable guides 50 provided on struts 46 and 48, the electrical connection of the ballast and power electronics on respective printed circuit boards 38, 40 takes place to one of fan motors 24, 26 assigned at the time, wherein the latter, in a manner not shown in detail in the figures, comprise bottom-side lateral cable lead-outs for laying the connections corresponding to a respective strut guide to the electronic assemblies.

FIG. 5 shows in the detailed view of a detail from FIG. 2 how an internal space 54 arises between casing segment 16 of carrier unit 14 on the one hand and a housing corner section 52 of housing shell 10 on the other hand, said internal space being used in the optimum manner to accommodate the shown printed circuit board: it becomes clear that, in the represented configurations, not only does the flat side of the printed circuit board (left-hand side in FIG. 5) lie in a heat-conducting manner, via an electrical insulation layer, adjacent to the cooling flat segment of metal casing 16 from outside the flow channel; it also becomes clear that even electronic components requiring considerable installation space such as diagrammatically shown capacitor 56 can be reliably accommodated; it immediately becomes clear that, in a departure from the generic prior art, this electronic assembly, and equally the opposite-lying other assembly, only uses installation space that is available anyway, without extending the axial length of the assembly (extension of axis 30 in FIG. 4) or projecting into the flow space.

The representation of FIG. 1 also illustrates how, according to a preferred development of the invention, a ventilation of this internal space 54 and therefore an additional heat dissipation (via the heat dissipation by means of metal element 14) can take place. It is shown how upper housing shell 12 (this applies equally to lower shell 10) comprises, in the region of a respective internal space 54, a pair of bores 58 as perforations with a defined cross-section. If these perforations come to lie on the inlet and outlet side in the assembled state of the fan device, an additional fluid flow thus arises (in the manner of a bypass through the main flow channel), with the effect that an air exchange takes place in this internal space, which additionally contributes to the thermal optimisation.

The present invention is not limited to the described example of embodiment; on the contrary, an arbitrary number of possibilities exist for varying the example of embodiment within the described inventive basic principle. These variations include, apart from an effective number of fan motors together with associated blade wheels, also a given position of the electronic assemblies at the respective outer edge; according to a development, these electronic assemblies can also be distributed on a plurality of carriers or printed circuit boards, just as one printed circuit board can feed or supply a plurality of motors. Carrier unit 14 can also be constituted arbitrarily as a central element; apart from the shown one-piece embodiment, the latter can be constituted multi-part, having a material selection differing from aluminium described by way of example (thus, for example, Al—Mg or Al—Zn die casting is also suitable, alternatively ceramic materials or suchlike), and it lies within the scope of arbitrary embodiments, to be suitably adapted to a given area of application, for the external shape, module design or integration of this carrier unit into a surrounding housing infrastructure to be suitably adapted or modified.

The invention claimed is:

1. A fan device comprising an electric motor assembly (24, 26) designed to drive at least one blade wheel (34, 36) in a flow channel (18) provided axial to the blade wheel, an electronic assembly (38, 40), which forms commutator and/or ballast electronics for the electric motor assembly, arranged in series with the electric motor assembly, and produced on a circuit carrier, a carrier unit (14) formed axially on or in the flow channel (18) for retaining the electric motor assembly, and a housing unit (10, 12) accommodating the carrier unit (14) and defining an inlet and an outlet for the flow channel (18), wherein the carrier unit (14) has an inwardly facing circumference which at least partially defines the flow channel (18), and is made from a thermally conductive material, wherein the carrier unit (14) has, on an outer segment (16) radially opposite to the flow channel (18), an outwardly facing mounting and cooling surface for interacting with the circuit carrier and/or power electronics components provided thereon in a heat-dissipating manner, wherein an internal space (54) is defined radially inwardly by the mounting and cooling surface of the carrier unit (14), radially outwardly by a corner-wall section of the housing unit (10, 12), and axially by a wall section of the housing unit (10, 12) wherein the corner-wall section is defined by solid walls, and further comprising a plurality of wall perforations (58) in the wall section of the housing unit, the plurality of wall perforations defining a ventilation path through the internal space (54) as a bypass to the flow channel for additional heat dissipation from the circuit carrier, wherein the electronics assembly (38, 40) is in the internal space (54), wherein the housing unit comprises an upper housing shell (12) and a lower housing shell (10) that meet along a parting line that is substantially transverse to the flow channel, and wherein the carrier unit is mounted between the lower housing shell and the upper housing shell; wherein the parting line of the housing is defined by a lower edge of the upper housing shell and an upper edge of the lower housing shell, and wherein at least a portion of the outwardly facing mounting and cooling surface of the carrier unit (14) is received between upper edge and the lower edge.

2. The device according to claim 1, wherein the carrier unit (14) is made of a metal and/or ceramic material, and/or comprises struts (20, 46, 48) preferably in one piece connecting the outer segment (16) to a hub section (22) designed to retain the electric motor assembly.

3. The device according to claim 2, wherein the struts (20, 46, 48) form or carry an electrical line guide (50) between the circuit carrier and the electric motor assembly.

4. The device according to claim 2, wherein the carrier unit (14), which is annular and/or forms a hollow-cylindrical flow channel section, comprises on the outer segment (16) at least one flat portion forming a polygonal outer contour in cross-section.

5. The device according to claim 2, wherein the carrier unit (14) is a turned, milled, cast and/or extruded assembly.

6. The device according to claim 1, wherein the frame and/or housing unit (10, 12) is made from a plastic material and has a polygonal outer contour and/or is constituted in an axially multi-shell manner for the axial retention and/or enclosure of the carrier unit.

7. The device according to claim 1, wherein the electric motor assembly comprises a pair of brushless fan motors (24, 26) each driving a blade wheel and constituted as external rotors, said fan motors being retained axially adjacent to one another on the carrier unit (14).

8. The device according to claim 7, wherein a pair of circuit carriers (38, 40) is assigned to the fan motors, said circuit carriers being provided in a heat-conducting manner on the common carrier unit, distributed around an outwardly facing circumference of the carrier unit (14), lying opposite one another in cross-section.

9. The device according to claim 7, wherein no electronics assembly is aligned along an axis of rotation of the pair of fan motors,
and/or the rotors of the fan motors are produced without the use of rare earth materials.

10. The device according to claim 7, wherein no printed circuit board is aligned along an axis of rotation of the pair of fan motors.

11. The fan device according to claim 1 adapted for the ventilation of control cabinets, system cabinets or system rooms of information-technology, power or high-frequency transmission electronics, wherein the modular fan device produces an electrical power consumption above 300 W.

12. The device according to claim 1, wherein the carrier unit has an octagonal peripheral contour.

13. The device according to claim 12, wherein the octagonal peripheral contour defines at least one outwardly facing surface that is received between the upper housing shell and the lower housing shell along the parting line.

14. The device according to claim 1, wherein the housing unit (10, 12) is defined by four walls tangentially adjacent to the carrier unit (14) to define a housing unit having a square shape in the plane transverse to the flow channel, and wherein the internal space (54) is contained entirely within the square shape.

15. The device according to claim 1, wherein the carrier unit (14) comprises a metallic material having an insulating film positioned between the carrier unit and the circuit carrier and/or power electronics components.

16. The device according to claim 1, wherein the carrier unit comprises a ceramic material.

17. The device according to claim 1, wherein the internal space (54) has a three-sided shape in a plane substantially transverse to the flow channel.

18. The device according to claim 1, wherein the carrier unit (14) further comprises a bore (42) for making an electrical connection between the electric motor assembly (24, 26) and the electronic assembly (38, 40).

19. The device according to claim 18, wherein the carrier unit (14) further comprises an insulating sleeve (44) surrounding the bore (42).

20. The device according to claim 1, wherein at least one of the upper housing shell and the lower housing shell has wall extensions at the corner-wall section that overlap the outwardly facing mounting and cooling surface of the carrier unit to define the inner space (54).

* * * * *